United States Patent [19]

Schultz

[11] Patent Number: 4,664,404
[45] Date of Patent: May 12, 1987

[54] TRACTOR REAR WEIGHT AND HITCH ASSEMBLY

[75] Inventor: Steven L. Schultz, Dubuque, Iowa
[73] Assignee: Deere & Company, Moline, Ill.
[21] Appl. No.: 821,637
[22] Filed: Jan. 23, 1986
[51] Int. Cl.$^4$ .............................................. A01B 35/32
[52] U.S. Cl. ................................ 280/461 A; 172/611; 280/759
[58] Field of Search .......... 280/461 A, 405 R, 405 B, 280/460 A, 456 A, 481, 759; 172/439, 611

[56] References Cited

U.S. PATENT DOCUMENTS

| | | | |
|---|---|---|---|
| 2,652,761 | 9/1953 | Gibson | 172/611 X |
| 3,135,404 | 6/1964 | Pilch | 280/759 X |
| 4,081,035 | 3/1978 | Bowen | 172/611 X |
| 4,102,407 | 7/1978 | Danszky et al. | 172/611 X |

FOREIGN PATENT DOCUMENTS 532007  1/1922  France ............................ 172/611

*Primary Examiner*—John J. Love
*Assistant Examiner*—Charles R. Watts

[57] ABSTRACT

A weight support assembly for mounting to the rear frame portion of a tractor comprising a first side and second sidewall, and a bottom support plate fixably mounted along the longitudinal sides thereof to the lower portion of respective sidewalls and extending generally horizontally. The frame's rearwardmost portion pivotally supporting the first and second sidewalls in transversely spaced apart relationship such that the first and second sidewalls extend generally vertical, the bottom support plate being located generally below the frame and extending generally inwardly forward of the frame. A first support arm and second support arm are pivotally mounted to the frame at a point therealong at one end and pivotally mounted at the other end to a respective one of the first and second sidewalls. A plurality of weights horizontally extending and vertically stacked on the bottom support plate. A plurality of bolts journalled vertically through the bottom support plate and weights. A plurality of nuts each of the nuts threadably secured to a respective bolt subsequent to the uppermost weight. Hitch means are mounted to the sidewalls.

14 Claims, 6 Drawing Figures

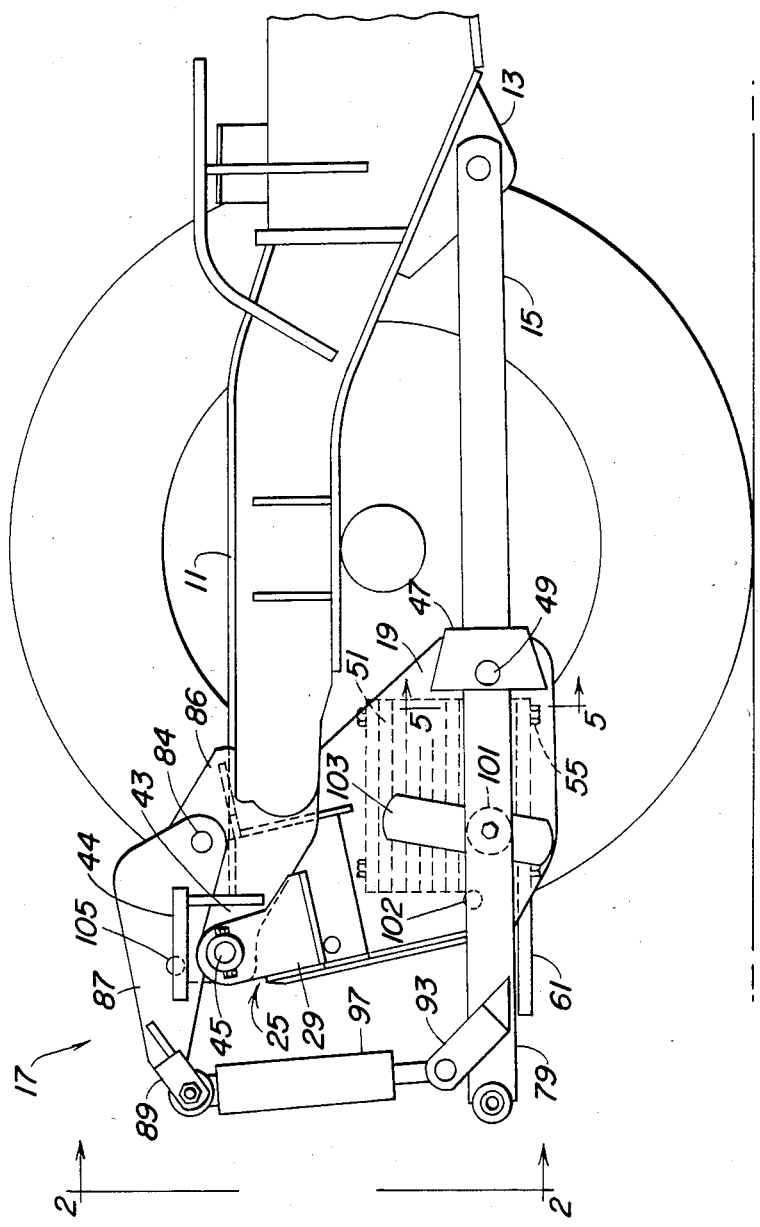

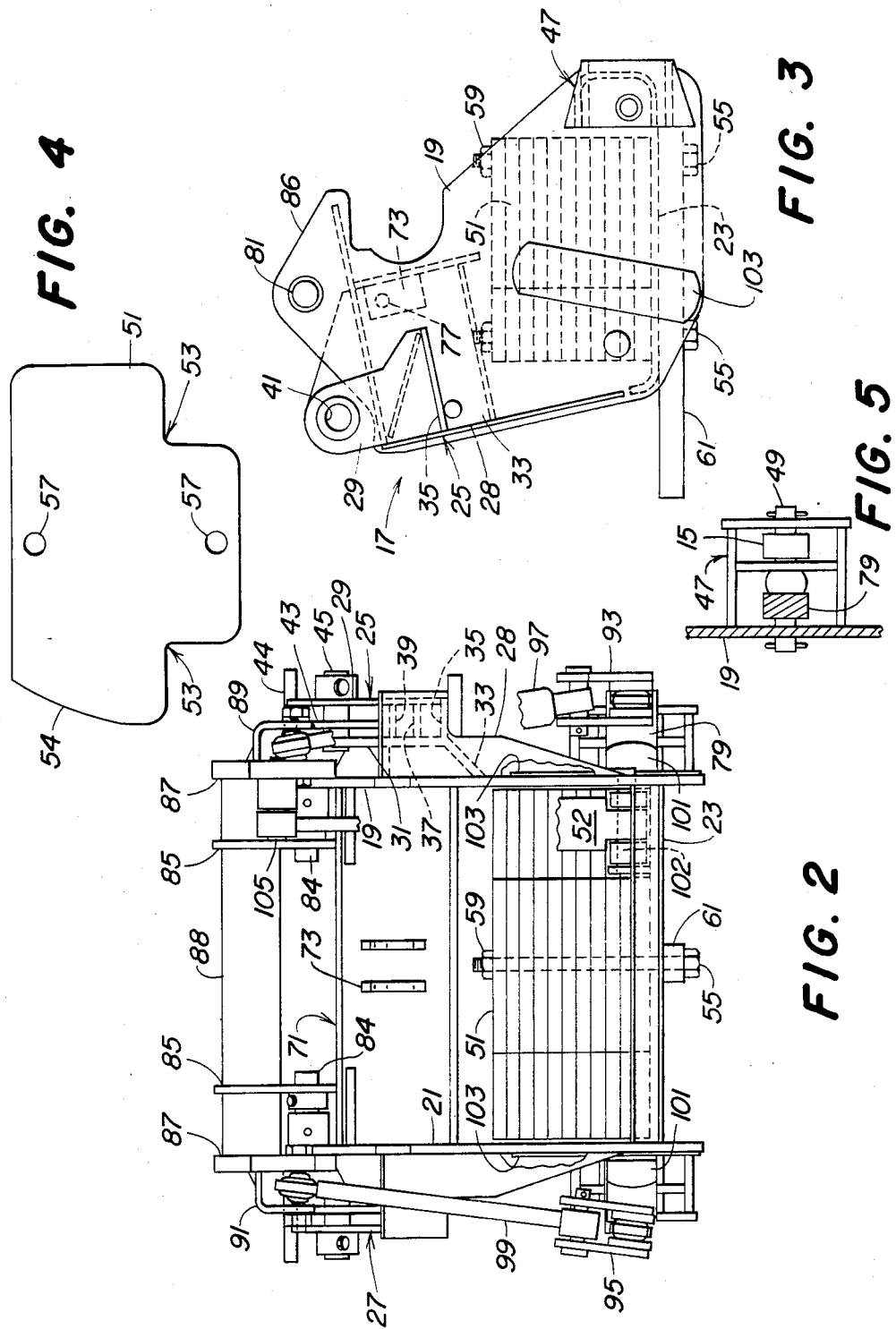

TRACTOR REAR WEIGHT AND HITCH ASSEMBLY

BACKGROUND OF THE INVENTION

This invention relates to tractors having a rear hitch assembly and, more suitably to industrial tractors wherein the invention provides a means for providing a rear weight assembly and three-point hitch assembly.

Tractors are customarily provided with means of attaching a variety of implements, such as, loader buckets, scarafiers, scrapers, etc. The attachment of various implements to the tractor alters the stability, traction and steering characteristics of the tractor. For example, the rear of the tractor may include a three-point hitch attaching a scaraifier. Ground engagement of the scarafier transfers some of the scarafier weight from the rear axle to the ground causing the rear wheels to lose traction. It is common practice to provide the tractor with attachment means for mounting front weights and rear wheel weights to provide tractor ballast. It is also customary to partially fill the rear tires with fluid in addition to or in place of rear wheel weights for rear tractor ballast.

The tractor rear axle can become overloaded, however, for example, when the rear portion of the tractor supports a hitch assembly, an implement, such as a backhoe loader, and when rear ballast is provided. The overloading is particularly undesirable during transport.

SUMMARY OF THE INVENTION

It is an objective of the present invention to present a weight support assembly for mounting to the rearwardmost frame portion of a tractor. The weight support assembly will receive and secure therein a most suitable number of weights in vertically stacked orientation rearward of the rear axle of the vehicle and generally inward of the rear frame portion so as to provide minimum interference with implement attachment. By so locating the weights within the support assembly, the effective ballast to the rear wheels of the vehicle is increased over comparable ballasting achieved by using wheel weights or fluid ballast of the rear tires.

It is a further object of the present invention to present a weight support assembly whereby individual weight members can be added or removed from the weight support assembly quickly and easily.

It is a still further objective of the present invention to present a three-point hitch arrangement on the weight support assembly for attaching implements to the vehicle without requiring removal of the weights or the weight support assembly by locating the weight support assembly relative to the hitch so as not to interfere with hitch operation.

Other benefits of the present invention will be noted or understood to those skilled in the art in the subsequent detailed description.

BRIEF DESCRIPTION OF THE DRAWINGS

FIG. 1 is a side elevation view of a portion of an industrial tractor frame having a weight support and three-point hitch assembly in accordance with the present invention.

FIG. 2 is a rear elevation view of the weight support and three-point hitch assembly, as taken along the line 2—2 of FIG. 1. For clarity, parts are broken away to show structure not otherwise visible.

FIG. 3 is a side elevation view of the weight support.

FIG. 4 is a top view of a weight suitable for mounting in the weight support assembly.

FIG. 5 is a sectional view of a support bracket, as taken along the line 5—5 of FIG. 1.

DESCRIPTION OF THE PREFERRED EMBODIMENT

Figure 6:
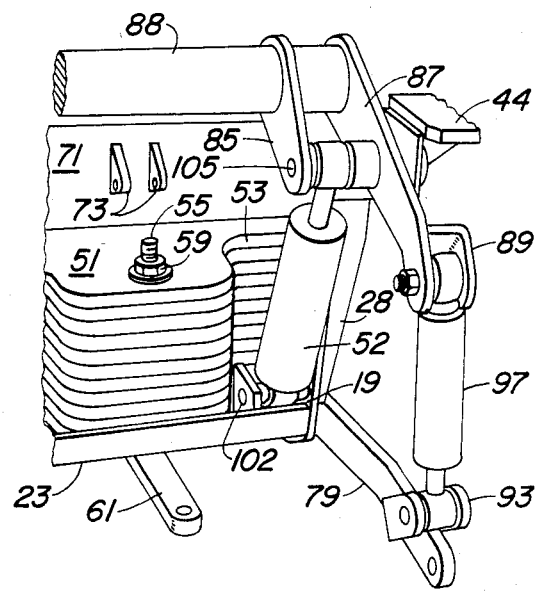
FIG. 6 is a rear perspective view of the right rear portion of the weight support and three-point hitch assembly.

Referring to FIG. 1, the invention as illustrated in a preferred embodiment is mounted to an industrial wheel tractor having a frame structure including longitudinally extending frame members 11 in a transverse spaced apart relationship. Fixably mounted by any conventional means to the underside of each frame member 11 in transverse alignment is a mounting member 13. A support arm 15 is pivotally mounted by any conventional means at one end to each mounting member 13. A weight support assembly, generally indicated as 17, more fully described below, is positioned between and vertically suspended from the rearwardmost portions of longitudinal frame members 11 and support arms 15.

Referring more particularly to FIGS. 2 and 3, the weight support assembly 17 includes a U-shaped weight-carrying cradle having transversely spaced sidewalls 19 and 21, and bottom support plate 23. The bottom support plate 23 is fixably mounted by any conventional means such as welding at its sides to sidewalls 19 and 21 such that the sidewalls 19 and 21 are held in generally spaced apart vertical alignment. Located generally along the top portions of sidewalls 19 and 21 are pivot support bracket structures respectively 25 and 27. The bracket structures 25 and 27 are identical in construction. Therefore, for the purpose of brevity, only bracket structure 25 will be described in detail. Bracket structure 25 is comprised of a vertical face plate 28 fixably mounted to sidewall 19 to extend generally transversely outward of the sidewall. A vertical support member 29 is fixably mounted by any conventional means such as welding along the outer edge of face plate 28 in generally parallel and spaced apart relationship to sidewall 19. A second support member 31 is fixably mounted by any conventional means such as welding to face plate 28 inwardly of and generally parallel to support member 29. A lower longitudinal portion 33 of support member 31 is angled inwardly such that a lower edge longitudinally abuts sidewall 19, the lower edge being thereto fixably mounted by any conventional means such as welding.

A plurality of reenforcing plates 35, 37, 39 are fixably mounted to plate 28 and between members 29 and 31. The vertical top portions of support members 29 and 31 includes transversely aligned apertures 41. The rearmost portion of each frame member 11 includes a vertical section 43 which is received between the top portions of support members 29 and 31 of the respective support bracket structures 25 and 27. A pin 45 is journalled through the respective aperture 41 of support member 29, section 43 of frame member 11 and aperture 41 of support member 31. The top portion of the weight support assembly 17 is, thereby pivotally supported transversely on the vehicle frame at the bracket structures 25, 27. The frame section 43 also has mounted thereto a platform 44 used for mounting a section of the vehicle's Roll Over Protection Structure (ROPS).

The support assembly 17 also includes a bracket 47 fixably mounted to the lower portion of each sidewall 19 and 21 by any conventional means such as welding. A respective support arm 15 extending rearwardly from mounting member 13 is pivotally mounted to each bracket 47 by any conventional means such as by a pin 49. The support arms 15 thereby restrain the weight support assembly 17 from pivoting about pin 45.

Referring in addition to FIG. 4, it is observed that the weight support assembly has an open face rearwardly which allows a plurality of weights 51 to be incurred therein in a vertically stacked orientation. The weights 51 in the preferred embodiment have L-shaped recesses 53 on the rearward lateral corners provided to avoid interference with a control cylinder, such as at 52, which may be associated with an implement attached to the rear of the tractor. Further, the weights 51 include arcuated sides 54 to facilitate placement and removal of the individual weights 51 from the weight support assembly 17. In some cases the weights may be placed or removed without disturbing an attachment implement. To provide further clearance to an attached implement, the weight support assembly 17 is supported substantially below the rear portion of the vehicle frame.

The weights 51 are stacked on support plate 23 and secured thereon by a plurality of long stem bolts 55 vertically journalled through the support plate 23 and respective apertures 57 in each weight 51. The bolts 55 are then secured by mating nuts 59. In the preferred embodiment, a tractor draw bar 61 is fixably mounted to and below the support plate 23 by the bolts 55 to extend rearwardly.

In the preferred embodiment, the three-point hitch assembly is mounted to the weight support structure 17 in a generally integrated manner. A transverse channel member 71 is fixably mounted at its ends by any conventional means, such as welding, to respective sidewalls 19 and 21. A bracket 73 is fixably mounted to and extends rearwardly from the back wall of channel member 71 and is adapted to pivotally receive an upper link of an implement three-point hitch. Lower hitch arms 79 are pivotally mounted at their forward ends to the brackets 47 and on the pins 49. The hitch arms 79 include brackets 93 and 95, respectively, near their outer ends. A tilt cylinder 97 is mounted at its ends to bracket 89 fixed on the rear ends of a right-hand lift arm 87, and bracket 93, respectively. A lift link 99 is pivotally mounted to bracket 91 fixed on the rear ends of a left-hand lift arm 87 and bracket 95, respectively. Fixably mounted by any conventional means along each lower hitch arm 79 is a sway pad 101 inwardly abutting a sway plate 103 fixably mounted to respective sidewalls 19 and 21 by any conventional means such as welding. The hydraulic cylinder 52 is anchored at its lower end on pivot pin 102 that extends inwardly from the wall 19. The upper end of cylinder 52 is pivotably connected to the right-hand rock or lift arms 85, 87 by pin 105. The arms 87 on the left- and right-hand sides are pivotally mounted on transverse pivot pins 84, carried in openings 81 provided in ears 86, rigidly projecting upwardly from the support assembly 17. A tube 88 extends through the arms 85, 87 and rigidifies the entire arm structure. Upon extension and retraction of cylinder 52, the arms 85, 87 will be raised and lowered to thereby effect similar action by hitch arms 79. Due to the shape of the weights 51, i.e., their having recesses 53, the cylinders 52 will not contact the weights.

I claim:

1. A weight support assembly for mounting to a rear frame portion of a tractor frame comprising:
   a first sidewall and a second sidewall;
   a bottom support plate fixably mounted along longitudinal sides thereof to lower portions of the respective sidewalls such that said first and second sidewalls extend generally vertical in transversely spaced apart relationship;
   means for pivotally mounting upper portions of said first and second sidewalls, respectively, to a rearwardmost portion of said frame;
   means for pivotally mounting said lower portions of said sidewalls to said frame;
   a plurality of lower hitch arms pivotally mounted to a respective one of said sidewalls and extending rearwardly;
   a rigid member extending generally transversely and fixably mounted at its respective transverse ends to said first and second sidewalls, said rigid member being vertically upward from said lower hitch arms; and
   an upper hitch arm pivotally mounted at one end to said rigid member to extend generally rearward.

2. A weight support assembly as claimed in claim 1 further comprising:
   a plurality of weights horizontally extending and vertically stacked on said bottom support plate; and
   means for securing said weights on said bottom support plate.

3. A weight support assembly as claimed in claim 2 wherein said means for securing said weights comprises a plurality of bolts extending vertically through said bottom support plate and said weights, a plurality of nuts, each of said nuts threadably secured to an end portion of a respective bolt, for retaining said weights on said bottom support plate.

4. A weight support assembly as claimed in claim 3 further comprising a draw bar fixably mounted to said bottom support plate by said bolts below said bottom support plate.

5. A weight support assembly as claimed in claim 1 further comprising: means for pivotally displacing said lower hitch arms simultaneously and cooperatively.

6. A weight support assembly as claimed in claim 5 wherein said means for pivotally displacing said lower hitch arms comprises a rock shaft pivotally mounted therealong to upper portions of said first and second sidewalls and having at each of its ends a respective rock arm extending rearwardly, two pairs of brackets, one bracket of each pair being fixably mounted to one of said rock arms and the other bracket of each pair being fixably mounted to one of said lower hitch arms, a lift link adjacent one of said sidewalls and pivotally mounted at its ends to a respective pair of said brackets and a double actig cylinder adjacent the other of said sidewalls pivotally mounted at its ends to the other pair of said brackets.

7. A weight support assembly for mounting to the rearwardmost portion for a rigid tractor frame comprising a first sidewall and second sidewall, a bottom support plate fixably mounted along the longitudinal sides thereof to the lower edge portions of the respective sidewalls and extending generally horizontally, said frame's rearwardmost portion pivotally supporting said first and second sidewalls in transversely spaced apart relationship and such that said first and second sidewalls extend generally vertical, said bottom support plate being located generally below said rearwardmost portion and extending generally forwardly of said rearwardmost portion of said frame, a first support arm, a second support arm, said first and second support arms being pivotally mounted to said frame at a point therealong at one end forwardly of said rearwardmost portion and pivotally mounted at the other end to a respective one of said first and second sidewalls, a plurality of weights horizontally extending and vertically stacked on said bottom support plate, a plurality of bolts journalled vertically through said bottom support plate and said weights, a plurality of nuts, each of said nuts threadably secured to a respective bolt subsequent to said uppermost weight.

8. A weight support assembly as claimed in claim 7 further comprising a draw bar fixably mounted to said bottom support plate by said bolts below said bottom support plate.

9. A weight support assembly as claimed in claim 7 wherein said weights have rearwardly L-shaped slotted corners and at least one arched sidewall.

10. A weight support assembly for mounting to a rear frame portion of a tractor frame comprising a first sidewall and second sidewall, a bottom support plate fixably mounted along longitudinal sides thereof to lower portions of the respective sidewalls and extending generally horizontally, said frame's rearwardmost portion pivotally supporting said first and second sidewalls in transversely spaced apart relationship and such that said first and second sidewalls extend generally below said frame and extending generally forwardly of said rearwardmost portion of said frame, a first support arm, a second support arm, said first and second support arm being pivotally mounted to said frame at one of their ends and pivotallly mounted at their other ends to said first and second sidewalls, a plurality of weights horizontally extending and vertically stacked on said bottom support plate, a plurality of bolts journalled vertically through said bottom support plate and said weights, a plurality of nuts, each of said nuts threadably secured to a respective bolt, for retaining said weights on said support plate, a plurality of lower hitch arms pivotally mounted respectively to said sidewalls and extending rearwardly and beyond said frame, a member extending generally transversely and fixably mounted at its respective ends to said first and second sidewalls, said member being located vertically upward from said lower hitch arms, and an upper hitch arm pivotally mounted at one end to said member to extend generally rearward.

11. A weight support assembly as claimed in claim 10 further comprising a rock shaft pivotally mounted to upper portions of said first and second sidewalls and having at its ends respective rock arms extending rearward, two pairs of brackets, one bracket of each pair being fixably mounted to one of said rock arms and the other bracket at each pair being fixably mounted to one of said lower hitch arms, a lift link pivotally mounted at its ends to a respective one of said brackets on said rock arms and said lower hitch arms, and a double acting cylinder pivotally mounted at its ends to the other pair of said brackets on said rock arms and said lower hitch arms.

12. A weight support assembly as claimed in claim 11 further comprising a sway pad fixably mounted along each lower hitch arm, and a sway plate fixably mounted to the respective sidewalls in abutting relationship to said sway pads.

13. A combination weight support and hitch assembly for mounting to the rear end of a tractor frame comprising a transverse weight-supporting cradle with opposite fore-and-aft extending sidewalls joined at their lower portions by a weight-carrying floor plate; transverse pivot means connecting upper rear portions of the sidewalls to the frame so that said cradle may swing to a position that is beneath and extends forwardly from said pivot means; links extending forwardly from and connecting said sidewalls to a section of said frame forward of the pivot means for holding the cradle in the aforesaid position; a pair of lower hitch arms extending rearwardly from said cradle and pivotally mounted to move vertically on the respective sidewalls, a pair of lift arms positioned vertically above the hitch arms and mounted on the side plates to rock about a transverse horizontal axis; vertically extending links extending between the lift arms and hitch arms; vertically extending cylinder means anchored to said cradle and said lift arms at lower and upper ends, respectively, to raise and lower said lift arms upon extension and retraction of said cylinder means; and an upper link connection mounted on the cradle above and centrally of the trailing links adapted for connection to an upper link of an implement three-point hitch.

14. The invention defined in claim 13 further characterized by weights being supported on the weight-carrying floor plate in vertical stacked relation and said plates having recessed edge sections such that when so stacked, there is provided a vertical recessed area receiving said vertically extending cylinder means.

* * * * *

UNITED STATES PATENT AND TRADEMARK OFFICE
CERTIFICATE OF CORRECTION

PATENT NO. : 4,664,404

DATED : 12 May 1987

INVENTOR(S) : Steven L. Schultz

It is certified that error appears in the above-identified patent and that said Letters Patent is hereby corrected as shown below:

```
Claim 6, line 12, delete "actig" and insert --acting--.
Claim 7, line 2, delete "for" and insert --of--.
Claim 10, line 12, delete "arm" (second occurrence) and
insert --arms--.
Claim 11, line 7, delete "at" and insert --of--.
Claim 13, line 13, after "mounted" insert --on the
respective sidewalls--; line 14, delete "on the respective
sidewalls".
```

Signed and Sealed this

Twenty-sixth Day of January, 1988

*Attest:*

DONALD J. QUIGG

*Attesting Officer*     *Commissioner of Patents and Trademarks*